(No Model.) 2 Sheets—Sheet 1.
F. L. KING.
CLOSED CONDUIT ELECTRIC RAILWAY.
No. 516,374. Patented Mar. 13, 1894.
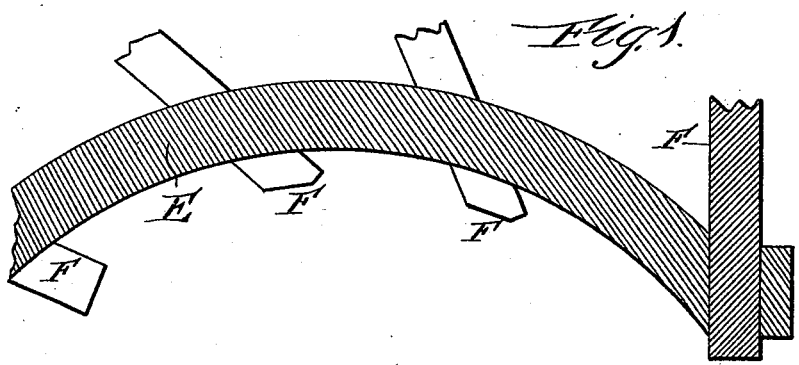
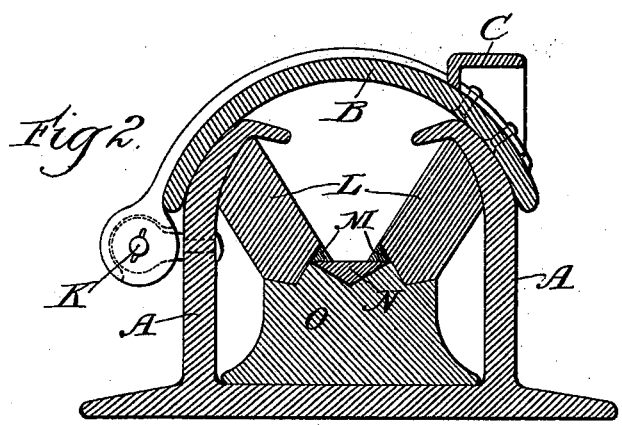
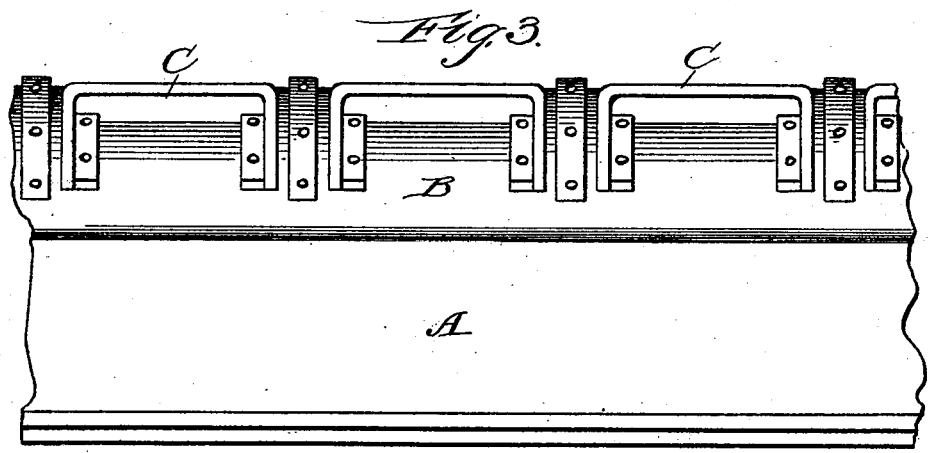
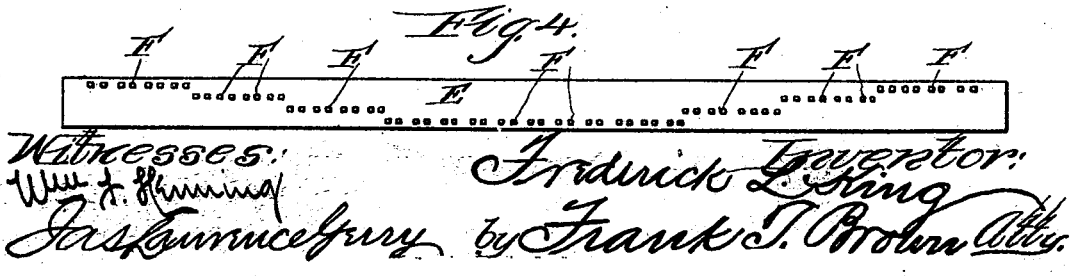

(No Model.) 2 Sheets—Sheet 2.
F. L. KING.
CLOSED CONDUIT ELECTRIC RAILWAY.
No. 516,374. Patented Mar. 13, 1894.
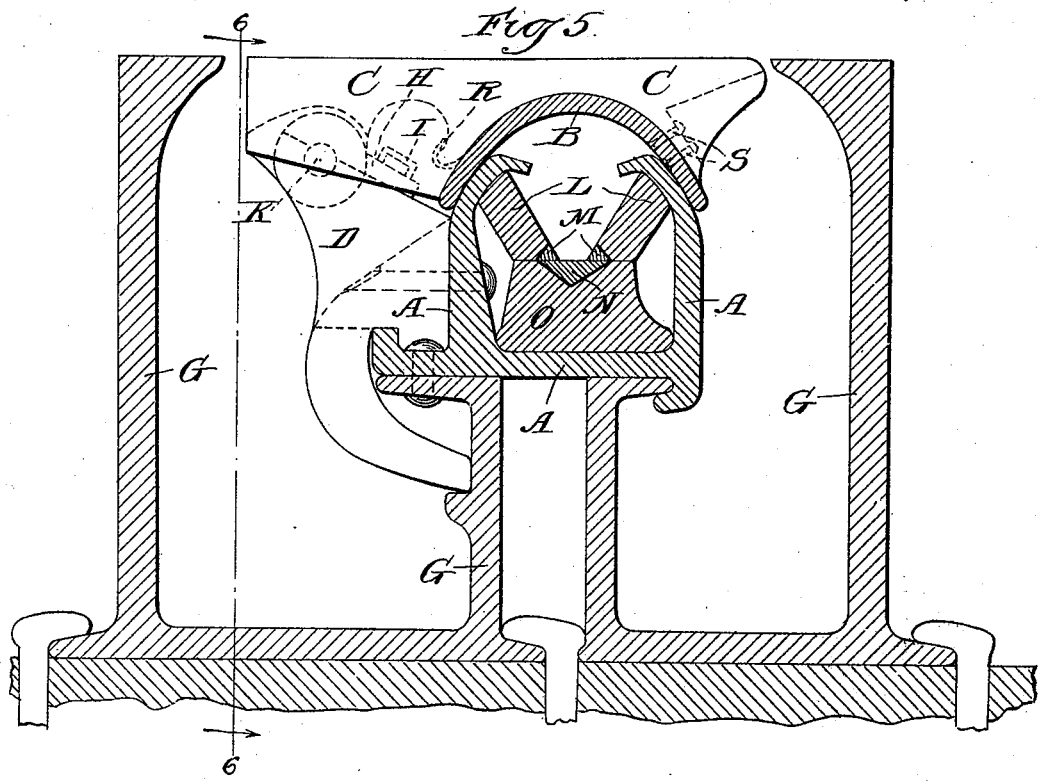
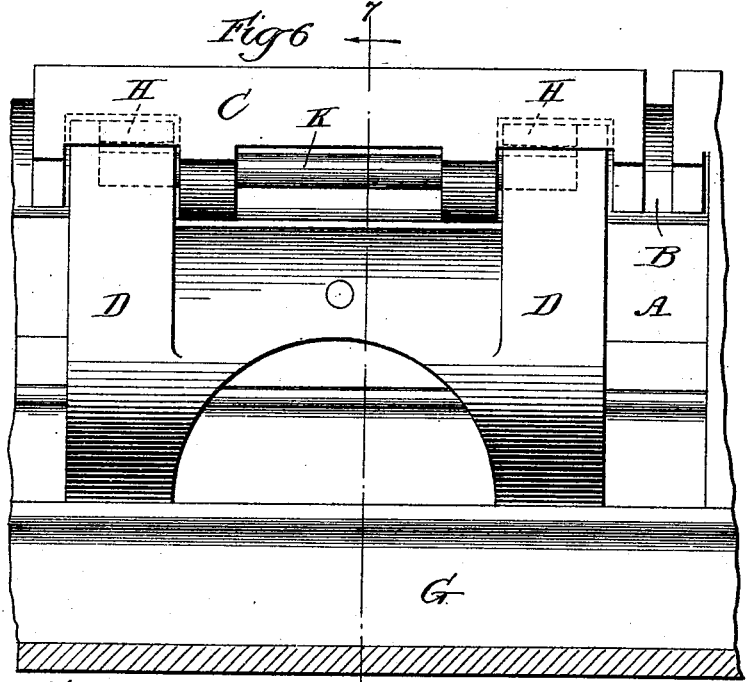
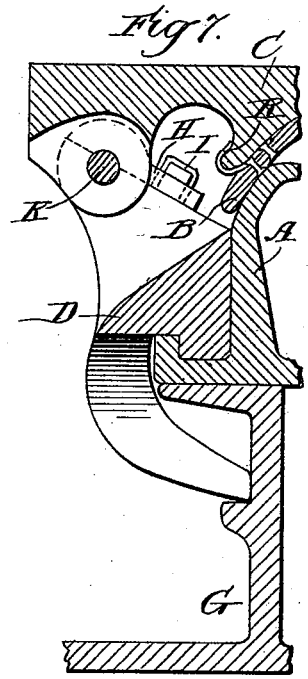

UNITED STATES PATENT OFFICE.

FREDERICK L. KING, OF CHICAGO, ILLINOIS.

CLOSED-CONDUIT ELECTRIC RAILWAY.

SPECIFICATION forming part of Letters Patent No. 516,374, dated March 13, 1894.

Application filed May 5, 1893. Serial No. 473,079. (No model.)

*To all whom it may concern:*

Be it known that I, FREDERICK L. KING, a citizen of the United States, residing at Chicago, in the county of Cook and State of Illinois, have invented new and useful Improvements in Electric Railways, of which the following is a specification.

This invention relates to a construction for inclosing an electrical conductor which is designed to be employed in connection with either surface or under-ground electric railways.

The object of the invention is to inclose the conductor in a conduit which will be moisture proof, and at the same time readily adapted to be opened to give access to the circuit completing device or trolley depending from the moving vehicle.

The invention consists in the construction and combination of parts substantially as hereinafter described, shown in the accompanying drawings and more particularly pointed out in the claims.

Like letters refer to the same parts in the several figures of the drawings in which—

Figure 1 illustrates a cross section of the frame work of the moving vehicle which carries magnets to operate in conjunction with a movable part of the chamber which incloses the conductor. Fig. 2, is a vertical cross section of the chamber which incloses the conductor, including the cover, and of the conductor itself. Fig. 3 is a detail inside elevation of a portion of the cover and the chamber. Fig. 4 is a diagram of the arrangement of magnets in the frame of the moving vehicle. Fig. 5 is a vertical cross section of a subway and inclosing chamber for the conductor adapted to street railway purposes. Fig. 6 is a side view of the bracket and hinge or pivot for the movable cover shown in Fig. 5. Fig. 7 is a transverse vertical section of the bracket and hinged cover. Fig. 8 is a detail view and plan of the cap piece for the pivots of the hinged cover.

The arrangement of the conductor which furnishes power for any electrical railway system is of prime importance, and the prominent and salient features of arrangement of any such system must be such that the conductors are kept perfectly dry, and all moisture excluded therefrom, and that it is at the same time readily accessible to the depending circuit completing device or trolley which is carried by the movable vehicle, and through which the electrical energy traversing the conductor is transferred to the motor on the vehicle.

It is manifest that while certain features of construction vary according to whether the conductor is used to supply the current of a street railway system or to other systems, yet the salient features above alluded to should be preserved in either system. Accordingly in the present case Sheet 1 of the drawings shows the invention applied to a system other than a street railway system and Sheet 2 of the drawings shows the same applied to a street railway system.

In the drawings, N designates the conductor which is formed of such material as is usually employed for such purposes, and rests upon a non-conducting base or support O. Projecting above such base and resting thereon are two pieces or posts L of similar non-conducting material which are preferably arranged to extend at such an angle with reference to the base piece that they will form a converging way for the trolley or other circuit completing device, and produce an approximately dove-tailed groove or socket to better retain the conductor and adjacent parts. I prefer to provide this conductor with a flat upper or contact surface and to arrange upon such conductor two hardened steel pieces M so that the wear occasioned by the travel of the trolley will be resisted. These steel pieces rest under the extension of the non-conducting projecting piece L and are held in place thereby. The parts just described, including the base piece, posts, steel pieces and conductors, should be arranged in a moisture proof chamber, as shown in the accompanying drawings, which is constructed with a base and arms having hooked ends for retaining the inclosed parts and yet having sufficient elasticity or flexibility to allow the posts to be sprung within them and there retained. The top of this chamber must be normally closed so as to prevent the access of moisture to the interior, and for this purpose I provide the cover B which is hinged and pivoted in any suitable manner to the arms or walls of the chamber, or bracket projecting therefrom. The cover should be made of some water-proof flexible material and I regard vulcanized fiber such as is used in ordinary hose water pipe as a good material for the purpose. This cover is of sufficient weight to remain normally closed but is designed to be automatically opened whenever the vehicle to be propelled travels adjacent to the conductor, because at that time it is necessary that the trolley or other circuit completing device shall be brought in contact with the conductor, and the cover if made of this flexible material will be adapted to be lifted for a portion only of its length or in other words for that portion immediately adjacent to the lifting power.

The inclosing chamber is designated in the drawings by the letter A and the cover by the letter B but upon such cover I arrange armatures C which as shown in Figs. 2 and 3 of the drawings are formed of short lengths of iron riveted to the flexible cover, but which in Figs. 5 and 6 are illustrated as composed of wide strips of similar metal for a purpose which will be hereinafter set forth.

Secured to the frame of the movable vehicle and to the part thereof commonly termed the engine or motor of such vehicle are arranged magnets for opening and closing the cover of the chamber. The arrangement of these magnets is best shown in Figs. 1 and 4 of the drawings, and is such that one set, say at the extreme right pass first over the armature upon any given section, and from magnetic action solely lifts the free end of the cover until the armatures thereof are brought within the magnetic field of the second set of magnets back of the first set and farther away from the armatures when they are in their normal position. The second set of magnets then lift to a greater extent a portion of the cover until the armatures thereon are brought within the magnetic field of the third set and the latter continue the lifting action until that portion of the cover is entirely opened by the fourth set of magnets. Of course the number of magnets employed and the number of sets and exact arrangement may be widely varied as may also the size and dimensions of such magnets. After the engine carrying the magnets has passed beyond the portion of the cover above referred to, it will of course cease its lifting operation on that portion of the cover and continue such operation upon the adjoining portion, and so on throughout the whole length. It will be perceived that it will not be necessary to divide the cover into actual sections to insure this lifting action and such division if made would be to a certain extent detrimental because of the tendency to leakage between the joints of the section, but by making the cover practically continuous in a longitudinal direction of flexible material such as described it is capable of being lifted in sections while under the action of the magnets without the severance of such sections from each other just as is any flexible material of considerable dimension. Of course when any particular portion of the cover is released from the lifting action of the magnets, upon the moving vehicle it will tend to fall and resume its normal position by its own weight but this may be assisted by a second series of magnets F' arranged as shown in Fig. 4. This second series of magnets F' not only assists in closing the cover but if the moving vehicle travels in the reverse direction, these magnets come into play as the active opening magnets, and the magnets F become the closing magnets.

The construction of the chamber and arrangement of armatures shown in Figs. 2 and 3 of the drawings are not adapted for the streets of cities and the base of the chamber A may be placed between the rails above the surface of the earth and rest on the ties but in situations exposed to the travel of wagons and similar vehicles it is found preferable to place all of the parts in a sub-way or channel such as is shown in Fig. 5, so that it will not interfere with such local traffic, nor be interfered with thereby. This subway or channel I have designated by the letter G, and as shown it incloses the chamber for the conductor and supports the same upon posts extending from the bottom thereof. The mouth of this subway must necessarily be wide enough to permit the movement of the cover in opening the same and the action of the magnets in effecting such opening of the cover; consequently unless such mouth is normally closed in some manner the wheels of vehicles and other extraneous articles would enter the subway which would be very detrimental, and to avoid this difficulty I have provided a casting C which so nearly closes the opening of the subway as to avoid all trouble in that direction. This casting has preferably a flat and smooth top surface and constitutes the armature for the magnets heretofore alluded to; in other words this casting is used in place of the series of pieces shown in Fig. 3 of the drawings as an armature for such magnets. Such armature extends as suggested nearly entirely across the mouth of the subway leaving only sufficient space to permit the play in the opening and closing of the cover. Of course, longitudinally these castings are not continuous, as is the flexible cover, but they are made in sections and arranged at suitable distance apart to insure the lifting of the cover by the magnets, as they pass over the same. The casting may be lightened by making it hollow or concaved, and it may be secured to the cover in any suitable manner, but I have shown a convenient construction for this purpose which consists in the hook R fastened to the cover, and hooking over the lug on the casting and the rivets S on the other side or edge of the cover. The casting is pivoted by an axis K in bearings formed in a bracket D which latter may be riveted to the arms of the chamber A and have projecting feet resting against lugs on the posts of the subway. The journals of the axis or pivot of the armature casting are covered by a cap such as is best shown in Figs. 5, 7 and 8 of the drawings; which is a piece of metal of curved form at one end and having a projecting tongue slotted to pass over a suitable staple through which a pin or key may be inserted to secure the cap in place.

It is obvious that many variations may be made in the details of the invention described in the specification, and illustrated in the drawings without departing from the principle thereof, and I therefore do not wish to be understood as limiting myself to such exact construction.

Having thus described my invention, what I claim as new, and desire to secure by Letters Patent of the United States, is—

1. In an electric railway the combination of an insulated conductor, a chamber inclosing the same, having a movable cover, of flexible material; and armatures arranged upon such cover with a vehicle adapted to travel over such cover, and carrying magnets, to act in conjunction with the armatures of such cover; substantially as and for the purpose set forth.

2. In an electric railway the combination of an insulated conductor a chamber inclosing the same, a flexible water tight cover for such chamber provided with armatures; with a vehicle carrying magnets adapted to act in conjunction with the armatures of the cover when they are carried over the same; substantially as and for the purpose set forth.

3. In an electric railway the combination of an insulated conductor, a chamber inclosing the same, a flexible water tight cover for such chamber provided with armatures; with a vehicle carrying sets of magnets arranged in different positions with reference to the armature, whereby the sets will act successively; substantially as and for the purpose set forth.

4. In an electric railway the combination of an insulated conductor a chamber inclosing the same, a flexible water-tight cover for such chamber provided with armatures; with a vehicle carrying several sets of magnets, the sets being positioned at different distances from the armatures, but each having its magnetic field overlap the magnetic field of the other substantially as and for the purpose set forth.

5. In an electric railway the combination of an insulated conductor, a chamber inclosing the same, a cover for such chamber provided with armatures with a vehicle carrying magnets having their magnetic fields overlap, and succeed each other; substantially as and for the purpose set forth.

6. In an electric railway, the combination of an insulated conductor, a chamber inclosing the same a flexible water-tight cover for such chamber provided with armatures; with a vehicle carrying upon one end sets of magnets the magnetic fields of which overlap and upon the other end a duplicate arrangement; substantially as and for the purpose set forth.

7. In an electric railway the combination of an insulated conductor, a chamber inclosing the same, a subway channel or casing inclosing such chamber, a flexible water-tight cover for the chamber, provided with armatures extending practically across the mouth of the subway casing and flush with the top surface of the same; substantially as and for the purpose set forth.

8. In an electric railway the combination of an insulated conductor, a chamber inclosing the same, a subway casing or channel inclosing the chamber, a flexible water-tight cover for such chamber provided with armatures extending approximately across the mouth of the subway casing, and flush with the top surface of the same, and pivoted in brackets, adjacent to such chamber; substantially as and for the purpose set forth.

9. In an electric railway the combination of an insulated conductor, a chamber inclosing the same, a subway casing or channel inclosing the chamber, a flexible water-tight cover for such chamber provided with armatures extending approximately across the mouth of the subway casing, and flush with the upper surface thereof, and pivoted in brackets secured to and supported by the walls of the chamber and casing; substantially as and for the purpose set forth.

10. In an electric railway, the combination of a subway or casing provided with posts projecting from its bottom, a chamber supported on such posts and inclosing an insulated conductor, a bracket riveted to the walls of the chamber, and having lugs extending to and resting upon legs on a post of the casing, a flexible water proof cover for the chamber pivoted in the bracket and cap pieces covering the journals of such pivot, and detachably secured to the bracket; substantially as and for the purpose set forth.

11. In an electric railway the combination of an insulated conductor, a chamber inclosing the same, a flexible water-tight cover for such chamber provided with armatures, and secured thereto by a hook at one edge, and rivets at the other; substantially as and for the purpose set forth.

12. In an electric railway, the combination of a metal chamber provided with a movable cover; with a conductor an insulating base piece on which the conductor rests; two pieces of hardened steel resting upon each side of the conductor, and an insulating superstructure, having an inclined or dove-tailed socket for retaining the conductor and steel pieces, and projected against the inside walls of the chamber; substantially as and for the purpose set forth.

In witness whereof I hereunto set my hand in the presence of two witnesses.

FREDERICK L. KING.

Witnesses:
GEO. A. LOWRY,
JAS. LAWRENCE GERRY.